US012596906B2

(12) United States Patent
Butler

(10) Patent No.: US 12,596,906 B2
(45) Date of Patent: Apr. 7, 2026

(54) DEVICE AND METHOD FOR MULTIPLE IDENTITY TAGS COUPLED TO A SINGLE ANTENNA OR SINGLE ANTENNA ARRAY

(71) Applicant: T-Mobile Innovations LLC, Overland Park, KS (US)

(72) Inventor: Robert Keith Butler, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 176 days.

(21) Appl. No.: 18/172,300

(22) Filed: Feb. 21, 2023

(65) Prior Publication Data

US 2024/0281634 A1 Aug. 22, 2024

(51) Int. Cl.
| | |
|---|---|
| *G06K 19/07* | (2006.01) |
| *G06F 21/44* | (2013.01) |
| *G06K 19/077* | (2006.01) |
| *H01Q 1/22* | (2006.01) |
| *H02J 50/00* | (2016.01) |

(52) U.S. Cl.
CPC ....... *G06K 19/07773* (2013.01); *G06F 21/44* (2013.01); *G06K 19/0709* (2013.01); *H01Q 1/2208* (2013.01); *H02J 50/001* (2020.01)

(58) Field of Classification Search
CPC .......... G06K 19/07773; G06K 19/0709; H02J 50/001; G06F 21/44; H01Q 1/2208
USPC ........................................................ 235/492
See application file for complete search history.

(56) References Cited

U.S. PATENT DOCUMENTS

| | | | |
|---|---|---|---|
| 6,249,227 B1 | 6/2001 | Brady et al. | |
| 2006/0145817 A1* | 7/2006 | Aikawa ................ | G06K 7/0008 |
| | | | 340/10.52 |
| 2008/0211637 A1 | 9/2008 | Smith | |
| 2012/0206243 A1 | 8/2012 | Butler et al. | |

(Continued)

FOREIGN PATENT DOCUMENTS

| | | |
|---|---|---|
| EP | 2963588 A1 | 1/2016 |
| EP | 4670080 A0 | 12/2025 |

OTHER PUBLICATIONS

Foreign Communication from a Related Counterpart Application, International Search Report and Written Opinion dated Apr. 16, 2024, International Application No. PCT/US2023/084971 filed on Dec. 19, 2023.

*Primary Examiner* — Daniel A Hess

(57) ABSTRACT

A multiple identity (ID) tag device is provided. The multiple ID tag device comprises an antenna, a power harvesting circuit electrically coupled to the antenna and configured to receive RF energy collected by the antenna and convert the RF energy into electrical power, a demodulation circuit electrically coupled to the antenna, a modulation circuit electrically coupled to the antenna, a selector circuit electrically coupled to the power harvesting circuit, the demodulation circuit, and the modulation circuit and configured to receive a first signal from the demodulation circuit, send a second signal to the modulation circuit, and receive electrical power from the power harvesting circuit, and a plurality of ID storage circuits electrically coupled to the selector circuit, each ID storage circuit configured to receive the first signal from the selector circuit, send the second signal to the selector circuit, and receive the electrical power from the selector circuit.

20 Claims, 5 Drawing Sheets

(56)                    References Cited

U.S. PATENT DOCUMENTS

| 2012/0319823 | A1 | 12/2012 | Butler et al. |
| 2014/0191846 | A1 | 7/2014 | Zhao et al. |

* cited by examiner

500

510

I/O

502

CPU

504

Secondary Storage

508

RAM

506

ROM

512

Network

DEVICE AND METHOD FOR MULTIPLE IDENTITY TAGS COUPLED TO A SINGLE ANTENNA OR SINGLE ANTENNA ARRAY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless identification tags respond to a radio frequency (RF) signal from a reader device by emitting an RF response signal. Some wireless identification tags have a battery or other power storage component, while other such tags harvest power from an ambient electromagnetic field. Some wireless identification tags emit an RF response signal in response to a signal comprising predetermined data, while other wireless identification tags emit an RF response signal in response to detecting RF radiation in a predetermined RF frequency band. Some such wireless identification tags are referred to as RFID tags.

SUMMARY

In an embodiment, a multiple identity (ID) tag device is disclosed. The multiple ID tag device comprises an antenna, a power harvesting circuit electrically coupled to the antenna and configured to receive RF energy collected by the antenna and convert the RF energy into electrical power, a demodulation circuit electrically coupled to the antenna, a modulation circuit electrically coupled to the antenna, a selector circuit electrically coupled to the power harvesting circuit, the demodulation circuit, and the modulation circuit and configured to receive a first signal from the demodulation circuit, send a second signal to the modulation circuit, and receive electrical power from the power harvesting circuit, and a plurality of ID storage circuits electrically coupled to the selector circuit, each ID storage circuit configured to receive the first signal from the selector circuit, send the second signal to the selector circuit, and receive the electrical power from the selector circuit.

In another embodiment, a multiple ID tag device is disclosed. The multiple ID tag device comprises an antenna and a plurality of ID storage modules electrically coupled to the antenna, each ID storage module comprising a power harvesting circuit electrically coupled to the antenna and configured to receive RF energy collected by the antenna from an ambient electromagnetic field, a demodulation circuit electrically coupled to the antenna, a modulation circuit electrically coupled to the antenna, and an ID storage circuit electrically coupled to the power harvesting circuit, the demodulation circuit, and the modulation circuit, the ID storage circuit configured to receive a first signal from the demodulation circuit, send a second signal to the modulation circuit, and receive electrical power from the power harvesting circuit.

In yet another embodiment, a method for activating a plurality of ID storage circuits electrically coupled to a power harvesting circuits is disclosed. The method comprises individually and sequentially powering each ID storage circuit of the plurality of ID storage circuits by supplying electrical power from a power harvesting circuit to the ID storage circuit, waiting a predetermined amount of time, and removing the electrical power from the ID storage circuit.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
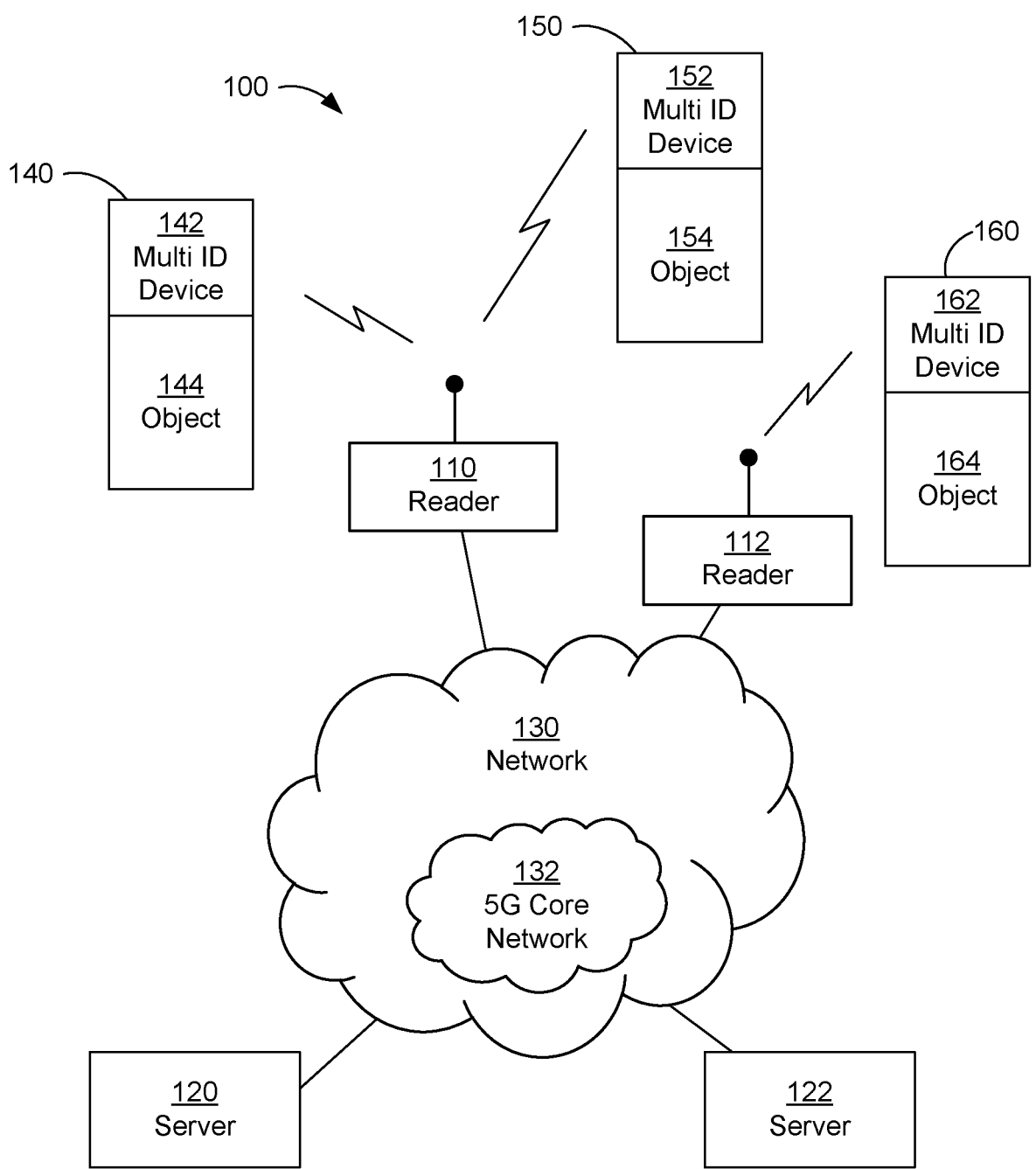
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Current wireless ID tags include a single ID storage circuit and antenna. The size of such a wireless ID tags is primarily determined by the size of the antenna. If more than one wireless ID tags are placed on an object, all tags will respond to a reader device unless modifications are made to the tags. Some such tags may be tuned to different RF frequency bands. Other such tags may, for example, have their antennas attached to a part of the object that is removed in the act of opening the object, so that the tag no longer responds to a reader device, indicating that the object has been opened.

A device according to the disclosure (also referred to herein as a multi-RFID package or a multi-tag device) comprises a plurality of ID storage circuits coupled to a single antenna or single antenna array. The ID storage circuits may share common RF modulation and demodulation circuits and power harvesting circuit, or each ID storage circuit may be part of an independent ID storage module that has its own RF modulation and demodulation circuits and power harvesting circuit. The term "RFID memory storage" or "RFID memory cell" is used herein to refer to both embodiments comprising commonly powered and modulated/demodulated ID storage circuits and embodiments comprising independently powered and modulated/demodulated ID storage modules.

The multi-tag device is configured to activate the ID storage circuits individually. Such activation may comprise individually powering the ID storage circuits or individually enabling and/or disabling ID storage circuits that share a common power source. Such enabling and/or disabling may be performed in response to receiving a password from the reader device or an ID storage circuit specified by the reader device may be individually enabled and/or disabled.

A first use for such a multi-tag device is to provide individual ID storage circuits for separate stages in the lifecycle of a product. For example, a first ID storage circuit may provide inventory information about a product (e.g., manufacturer and product identifier), while a second ID storage circuit provides product packaging information about the product (e.g., materials used in the container of the product). When the product is sold to a purchaser, a vendor reader may scan the first ID storage circuit to update the vendor's inventory records. In this same transaction, the first ID storage circuit may be disabled, preventing the first ID storage circuit from being scanned again in the future to identify or track the purchaser of the product. When the product container is later presented for recycling, a recycler reader may scan the second ID storage circuit to direct the product container into a recycling bin for the container material.

A second use for such a multi-tag device is to provide multiple programmable bits of data that encode information about an object to which the multi-tag device is attached. For example, a multi-tag device with eight ID storage circuits that can be individually enabled and disabled, is capable of encoding eight bits of information. A reader that is configured to individually read the eight ID storage circuits (using different frequency bands or different interrogation signals) may then determine an eight-bit binary value encoded by the enabled/disabled status of the eight ID storage circuits.

In an example, when such a multi-tag device having eight ID storage circuits is attached to a bin on a conveyor belt of a manufacturing facility, two ID storage circuits may be enabled/disabled to indicate that the objects in the bin are of one of four different brands, three other ID storage circuits may be enabled/disabled to indicate that the objects in the bin are of one of eight different products of that brand, and three other ID storage circuits may be enabled/disabled to indicate a stage of the manufacturing cycle for the objects.

In some embodiments, a multiple RFID package comprises a power harvesting component that receives energy from at least one antenna (i.e., from an antenna or antenna array), where the antenna harvests from the ambient electromagnetic fields. The power harvesting component can distribute conditioned electrical power to one or more of the different RFID memory storages to activate these items. In some embodiments, the power harvesting component can encapsulate a simple logic device or processor (or this function could be provided by a simple logic device or processor separate from the power harvesting component) that can provide intelligence and control generally for the multiple RFID package. For example, the power harvesting component can respond to an external query by capturing a code or ID that is presented by an external reader, sequentially power (or activate) each separate RFID memory storage, present to each the captured code or ID, and if one RFID memory storage responds by returning the information it stores, the power harvesting component can broadcast this via the antenna (or antenna array) to the reader device. In some embodiments, the multiple RFID package comprises a power storage component (e.g., a battery) that is supplied power by the power harvesting component and which can be piped by the power harvesting component to one or more selected RFID memory storages. By sharing a single antenna or antenna array and possibly sharing a single power harvesting component and optional power storage component among a plurality of RFID memory storages, cost savings and space savings is obtained versus an alternative solution involving affixing a plurality of unique RFID tags to a single article.

Each of the RFID memory storages may provide a writeable bit or flag (or a blowable fuse) that can be commanded once to disable that RFID memory storage from ever responding again. In other embodiments, each of the RFID memory storages may provide a writeable bit or flag that can be set or cleared to disable/enable the RFID memory storage from responding.

Turning now to FIG. 1, a communication system 100 according to the disclosure is described. In an embodiment, the system 100 comprises readers 110 and 112, and servers 120 and 122, communicating wired or wirelessly via a network 130. The network 130 may be one or more public networks, one or more private networks, or a combination thereof. The network 130 may comprise or be coupled to a 5G core network 132 or, in other embodiments, a 4G or 4G Long Term Evolution (LTE) network.

The readers 110 and 112 may be in RF communication with one or more of multi-tagged objects 140, 150, and 160. The multi-tagged object 140 comprises a multi-tag device 142 physically coupled to an object 144. The multi-tagged object 150 comprises a multi-tag device 152 physically coupled to an object 154. The multi-tagged object 160 comprises a multi-tag device 162 physically coupled to an object 164.

The readers 110 and 112 may communicate with the multi-tag devices 142, 152, and 162 using one or more frequency ranges, such as 433 MHZ, 860-960 MHZ, 2.45 GHZ, 2.496 GHz, and 5.8 GHz.

The servers 120 and 122 may make any desired use of the ID information read from the multi-tag devices 142, 152, and 162. In one example, the server 120 may provide an inventory function for a retailer and the reader 110 may be located at the retailer's point of sale. When the multi-tag device 142 is read by the reader 110, a signal may be sent by the reader 110 via the network 130 to the server 120 to register a decrease in the retailer's inventory level of the objects 144.

In a second example, the server 122 may provide conveyor belt routing control in a manufacturing facility and the reader 112 may be located near a conveyor belt switch mechanism. Where the object 164 is a bin on the conveyor belt, the reader 112 may read information from the multi-tag device 162 and send the information to the server 122. The server 122 may use the information to cause the conveyor belt switch mechanism to direct the object 164 onto a desired conveyor belt.

Figure 2:
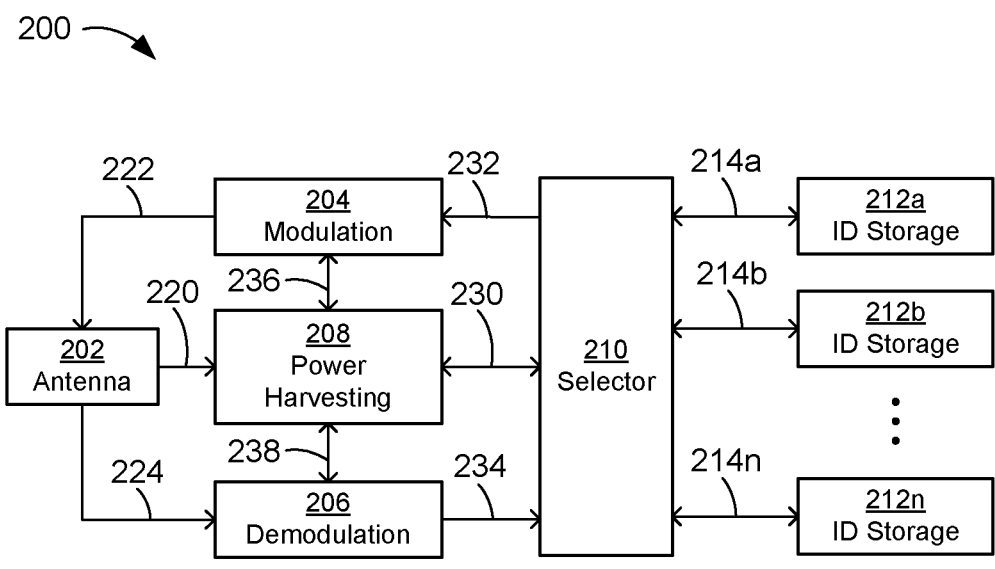
FIG. 2 is a block diagram of a device according to a first embodiment of the disclosure.

FIG. 2 illustrates a multi-tag device 200 according to a first embodiment of the disclosure. The multi-tag device 200 comprises an antenna 202 electrically coupled to a modulation circuit 204, a demodulation circuit 206, and a power harvesting circuit 208. The power harvesting circuit 208 is configured to receive RF energy from the antenna 202 via a conductor 220. The power harvesting circuit 208 is configured to convert the RF energy into DC power and/or AC power using a rectifier or other component. The antenna 202 is configured to receive RF signals for transmission from the modulation circuit 204 via a conductor 222. The antenna 202 is configured to provide received RF signals to the demodulation circuit 206 via a conductor 224. In some embodiments, the antenna 202 may be an antenna array.

The multi-tag device 200 further comprises a selector circuit 210 electrically coupled to the modulation circuit 204, the demodulation circuit 206, and the power harvesting circuit 208. The selector circuit 210 is configured to receive electrical power and to receive and/or send control signals from and/or to the power harvesting circuit 208 via a conductor 230. The selector circuit 210 is configured to send baseband response signals to the modulation circuit 204 via a conductor 232, for modulation into RF signals. The selector circuit 210 is configured to receive demodulated baseband signals from the demodulation circuit 206 via a conductor 234. The power harvesting circuit 208 is configured to provide electrical power to and receive baseband response signals from the modulation circuit 204 via a conductor 236. The power harvesting circuit 208 is configured to provide electrical power to and receive demodulated baseband signals from the demodulation circuit 206 via a conductor 238.

The multi-tag device 200 still further comprises a plurality of ID storage circuits 212a-212n electrically coupled to the selector circuit 210. The selector circuit 210 is configured to send electrical power and/or a first signal received from the demodulation circuit 206 to one or more of the ID storage circuits 212a-212n via conductors 214a-n, respectively. The first signal may be a baseband signal comprising, for example, interrogation data. The selector circuit 210 is configured to receive a second signal from one or more of the ID storage circuits 212a-212n via conductors 214a-n, respectively. The selector circuit 210 is configured to send the second signal to the modulation circuit 204. The second signal may be a baseband signal comprising, for example, response data.

In some embodiments, the power harvesting circuit 208 comprises a processor or other circuit configured to receive a 'signal received' signal from one of the demodulation circuit and the selector circuit that indicates the receipt of the first signal from the demodulation circuit 206. The power harvesting circuit 208 is further configured to determine whether one of the ID storage circuits 212a-212n responds to the first signal based on a 'response sent' signal received from one of the modulator circuit and the selector circuit.

In some such embodiments, the power harvesting circuit 208 is configured to determine whether one of the ID storage circuits 212a-212n responds to the first signal by activating a first ID storage circuit of the ID storage circuits 212a-212n and determining whether the activated first ID storage circuit responds to the first signal. If the first ID storage circuit does not respond to the first signal, the power harvesting circuit 208 is configured to deactivate the first ID storage circuit, activate a second ID storage circuit of the ID storage circuits 212a-212n, and determine whether the activated second ID storage circuit responds to the first signal. As such, the power harvesting circuit 208 is configured to individually and sequentially power (or activate) each of the ID storage circuits 212a-212n until:

(i) an ID storage circuit responds to the first signal, at which point the power harvesting circuit 208 ceases activating ones of the ID storage circuits 212a-212n, or
  (ii) the power harvesting circuit 208 has activated all of the ID storage circuits 212a-212n and made the determination that none of the ID storage circuits 212a-212n has responded to the first signal.

Figure 3:
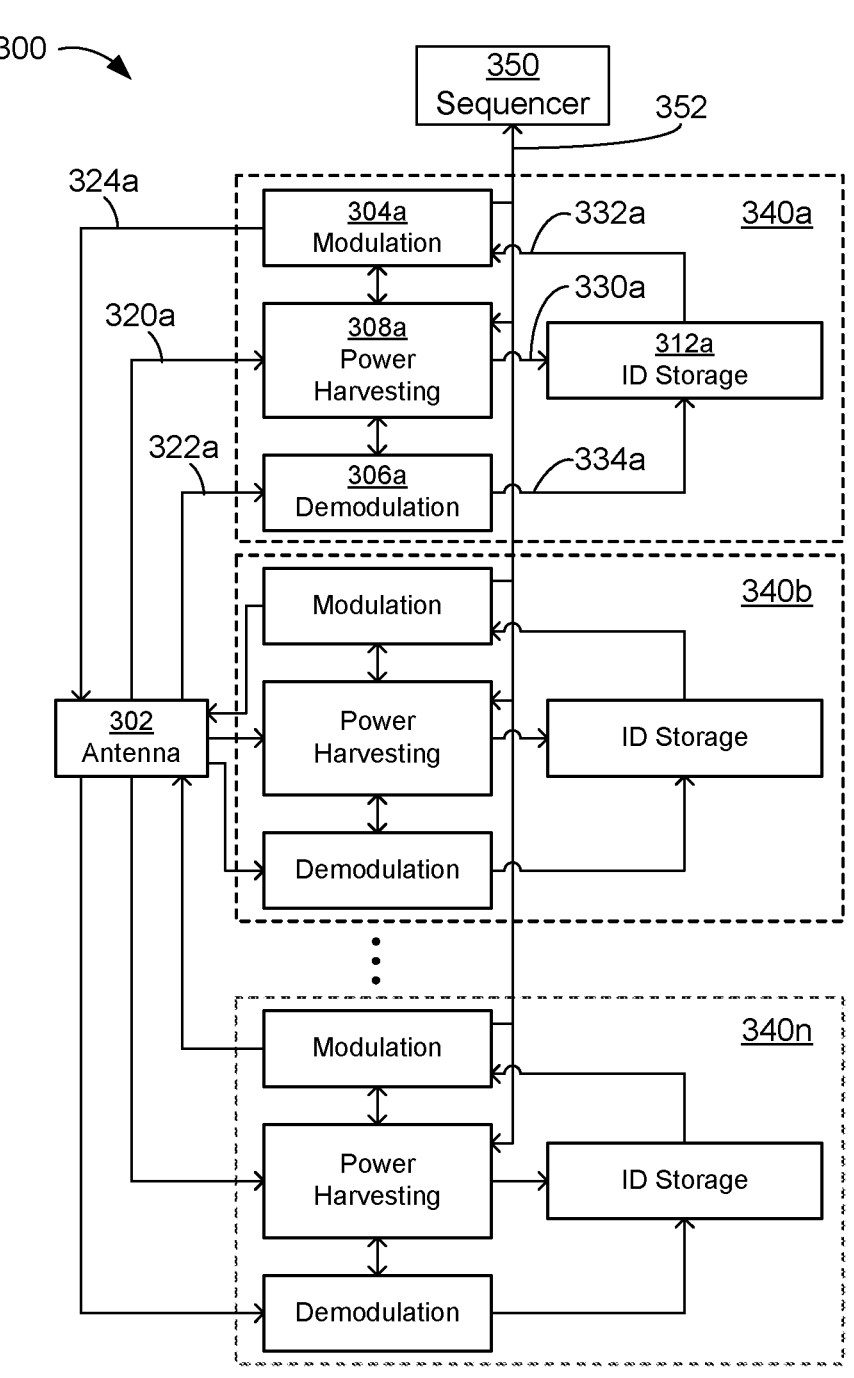
FIG. 3 is a block diagram of a device according to a second embodiment of the disclosure.

FIG. 3 illustrates a multi-tag device 300 according to a second embodiment of the disclosure. The multi-tag device 300 comprises an antenna 302, a plurality of ID storage modules 340a-340n. Referring to ID storage module 340a as an example, each of the plurality of ID storage modules 340a-340n comprises a modulation circuit 304a, a demodulation circuit 306a, a power harvesting circuit 308a, and an ID storage circuit 312a. The power harvesting circuit 308a is configured to receive RF energy from the antenna 302. The power harvesting circuit 308a is configured to convert the RF energy into DC power using a rectifier or other component. The antenna 302 is configured to receive RF signals for transmission from the modulation circuit 304a via a conductor 324a. The antenna 302 is configured to provide received RF signals to the demodulation circuit 306a via a conductor 322a. In some embodiments, the antenna 302 may be an antenna array.

When the antenna 302 receives RF energy, the RF energy is sent simultaneously to all of the ID storage modules 340a-340n. When the antenna 302 receives an RF signal, the RF signal is sent simultaneously to all of the ID storage modules 340a-340n. The antenna 302 is configured to receive RF signals for transmission simultaneously from all of the ID storage modules 340a-340n.

The ID storage circuit 312a is coupled to the modulation circuit 308a via a conductor 330a, to the modulation circuit 304a via a conductor 332a, and to the demodulation circuit 306a via a conductor 334a. The ID storage circuit 312a is configured to receive electrical power and control signals from the power harvesting circuit 308a via the conductor 330a. The ID storage circuit 312a is configured to send baseband response signals to the modulation circuit 304a via the conductor 332a, for modulation into RF signals. The ID storage circuit 312a is configured to receive demodulated baseband signals from the demodulation circuit 306a via the conductor 334a.

In some embodiments, each of the power harvesting circuits 308a-308n is configured to:
  (i) wait for a first predetermined amount of time after receiving RF energy from the antenna 302 before applying electrical power to the demodulation circuit 306a-306n, the modulation circuit the 304a-306n, and the ID storage circuit 312a-312n of its associated ID storage module 340a-340n, and
  (ii) wait for a second predetermined amount of time after applying electrical power before removing electrical power from the demodulation circuit 306a-306n, the modulation circuit 304a-306n, and the ID storage circuit 312a-312n of its associated ID storage module 340a-340n.

The first and second predetermined amounts of time may be configured to result in each of the ID storage modules 340a-340n being powered separately to respond with second data to first data that is received along with the RF energy via the antenna 302 from a reader device. Such second data may be sent from the ID storage circuit 312a-312n via the modulation circuit 304a-306n of the powered ID storage module 340a-340n to the antenna 302. In this way, when the multi-tag device 300 is in range of a reader device, one or more of the ID storage modules 340a-340n may individually respond to first data sent by the reader device without interfering with responses from other ID storage modules.

In other embodiments, the multi-tag device 300 further comprises a sequencer circuit 350 coupled to the modulation circuits 304a-304n and the power harvesting circuits 308a-308n via a conductor 352. The sequencer circuit 350 is configured to respond to RF energy received via the antenna 302 from a reader device by activating one of the ID storage modules 340a-3402n by sending a signal to the associated power harvesting circuit 308a-308n via the conductor 352.

If the activated ID storage module 340a-3402n responds with second data to first data that is received along with the RF energy via the antenna 302, the sequencer circuit 350 is configured to receive a signal from the modulation circuit 304a-306n of the activated ID storage module 340a-340n via the conductor 351, the signal indicating that the response was sent.

The sequencer circuit 350 is configured to continue activating different ones of the ID storage modules 340a-3402n until all the ID storage modules 340a-3402n have been activated without a response being sent. In some such embodiments the sequencer circuit 350 is configured to cease activating the ID storage modules 340a-3402n once one of the ID storage modules 340a-3402n has sent a response. In other such embodiments, the sequencer circuit 350 is configured to continue activating other ones of the ID storage modules 340a-3402n after one of the ID storage modules 340a-3402n has sent a response.

In some embodiments, the power harvesting circuit 208 or the power harvesting circuit 308 may comprise a battery, capacitor, or other power storage component. In other embodiments, the power harvesting circuit 208 or 308 is configured to receive from the antenna 202 or 302 via the demodulation circuit 206 or 306 a disable signal that includes information specifying one of ID storage circuits 212a-212n or one of ID storage modules 303a-303n. The power harvesting circuit 208 or 308 is further configured to, in response to the disable signal, disable the specified ID storage circuit or ID storage module. In some such embodiments, the disable signal further includes a received password and the power harvesting circuit 208 or 308 is configured to disable the specified ID storage circuit or ID storage module only in response to determining that the received password matches a stored password that is stored in the multi-tag device 200 or 300.

In some such embodiments, the power harvesting circuit 208 or 308 is further configured to receive from the antenna 202 or 302 via the demodulation circuit 206 or 306 an enable signal that includes information specifying one of ID storage circuits 212a-212n or one of ID storage modules 303a-303n. The power harvesting circuit 208 or 308 is further configured to, in response to the enable signal, enable the specified ID storage circuit or ID storage module.

In some embodiments of the multi-tag device 200, some or all of the modulation circuit 204, the demodulation circuit 206, the power harvesting circuit 208, the selector circuit 210, and the plurality of ID storage circuits 212a-212n may be provided (or fabricated) on a single semiconductor substrate. In some such embodiments, the antenna 202 may also be provided on the single semiconductor substrate.

In some embodiments of the multi-tag device 300, the antenna 302 and the sequencer 350 may be provided on a single semiconductor substrate. In some such embodiments, one or more ID storage modules of the plurality of ID storage modules 340a-340n may also be provided on the single semiconductor substrate.

In various embodiments, the modulation circuit 204 and/or the modulation circuits 304a-304n comprise an electrical circuit that receives a baseband signal input and modulates an RF carrier frequency with the received signal. In various embodiments, the demodulation circuit 206 and/or the demodulation circuits 306a-306n comprise an electrical circuit that receives a modulated RF signal input having a predetermined carrier frequency and detects (or extracts) a signal with which the RF signal was modulated, producing a corresponding baseband signal. In various embodiments, such modulation and demodulation circuits may utilize amplitude-modulation or frequency-modulation.

In various embodiments, the power harvesting circuit 208 and/or the power harvesting circuits 308a-308n comprise an electrical circuit that receives a varying RF energy field and uses a rectifier or other AC-to-DC converter to convert the received RF energy into a DC voltage. In some embodiments, the power harvesting circuit 208 and/or the power harvesting circuits 308a-308n comprise an electrical circuit that converts the received RF energy into a lower frequency AC voltage.

In various embodiments, the ID storage circuits 212a-212n and/or the ID storage circuits 312a-312n comprise non-volatile semiconductor memory devices such as one or more types of read only memory (ROM). In some such embodiments, the ID storage circuits 212a-212n and/or the ID storage circuits 312a-312n additionally or alternatively comprise volatile semiconductor memory devices such as one or more types of random access memory (RAM).

Figure 4:
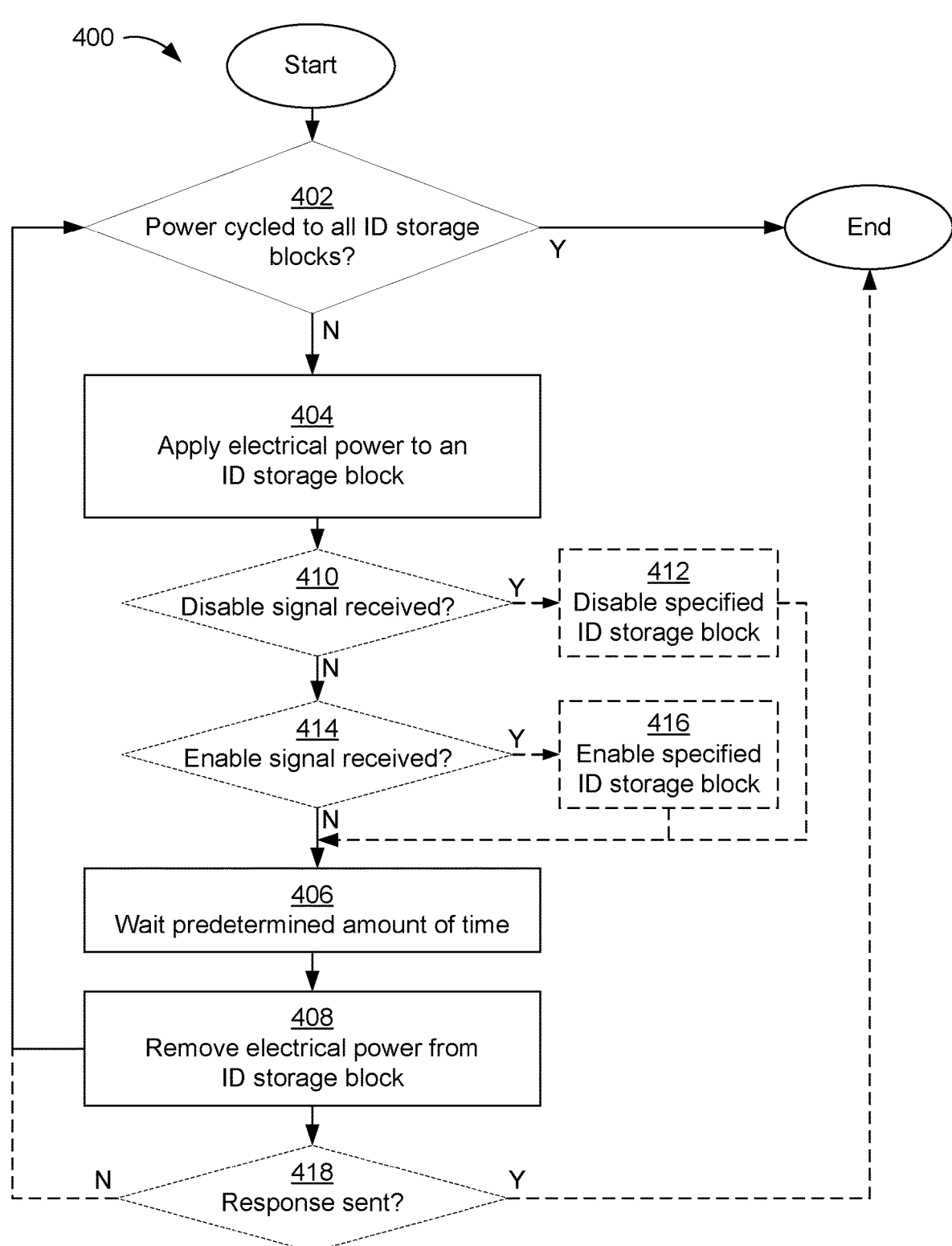
FIG. 4 is a flow chart of a method 400 according to an embodiment of the disclosure.

FIG. 4 is a flow chart of a method 400 according to an embodiment of the disclosure. In an embodiment, the method 400 is a method for implementing either the multi-tag device 200 of FIG. 2 or the multi-tag device 300 of FIG. 3. The method 400 may be performed by either the power harvesting circuit 208 of the multi-tag device 200 or the sequencer circuit 350 of the multi-tag device 300. Reference to the power harvesting circuit 208 will be made for purposes of the following description. The ID storage circuits 212a-212n of FIG. 2 and the ID storage modules 303a-303n are referred to collectively in the following description as "ID storage blocks."

At step 402, the power harvesting circuit 208 determines whether power has been cycled to all ID storage blocks in the multi-tag device 200. If it is determined that all ID storage blocks have had their power cycled, the method 400 terminates.

If fewer than all ID storage blocks have had their power cycled, at step 404 the power harvesting circuit 208 applies electrical power to an ID storage block that has not yet had its power cycled. At step 406, the power harvesting circuit 208 waits for a predetermined amount of time (e.g., to allow the powered ID storage block to respond to an interrogation signal being received). At step 408 the power harvesting circuit 208 removes electrical power from the powered ID storage block and goes back to step 402.

In some embodiments, after applying power to the ID storage block at step 404, at step 410 the power harvesting circuit 208 determines whether a disable signal is being received via the demodulation circuit 206. If it is determined that the disable signal is being received, at step 412 the power harvesting circuit 208 determines whether the disable signal should be acted on, by determining whether the disable signal specifies the powered ID storage block and, in some such embodiments, whether the disable signal includes a password that matches a stored password that is stored in the multi-tag device 200. If it is determined that the disable signal should be acted on, the power harvesting circuit 208 disables the powered ID storage block. From step 412, the method 400 goes to step 406.

In some embodiments, after checking for a disable signal at step 410, at step 414 the power harvesting circuit 208 determines whether an enable signal is being received via the demodulation circuit 206. If it is determined that the enable signal is being received, at step 416 the power harvesting circuit 208 determines whether the enable signal should be acted on, by determining whether the enable signal specifies the powered ID storage block and, in some such embodiments, whether the enable signal includes a password that matches a stored password that is stored in the multi-tag device 200. If it is determined that the enable signal should be acted on, the power harvesting circuit 208 enables the powered ID storage block. From step 416, the method 400 goes to step 406.

In some embodiments, after removing the electrical power from the powered ID storage block in step 408, at step 418 the power harvesting circuit 208 determines whether the powered ID storage block sent a response while it was powered. If the powered ID storage block did not send a response while it was powered, the method 400 goes to step 402. If the powered ID storage block did send a response while it was powered, the method 400 terminates.

Figure 5:
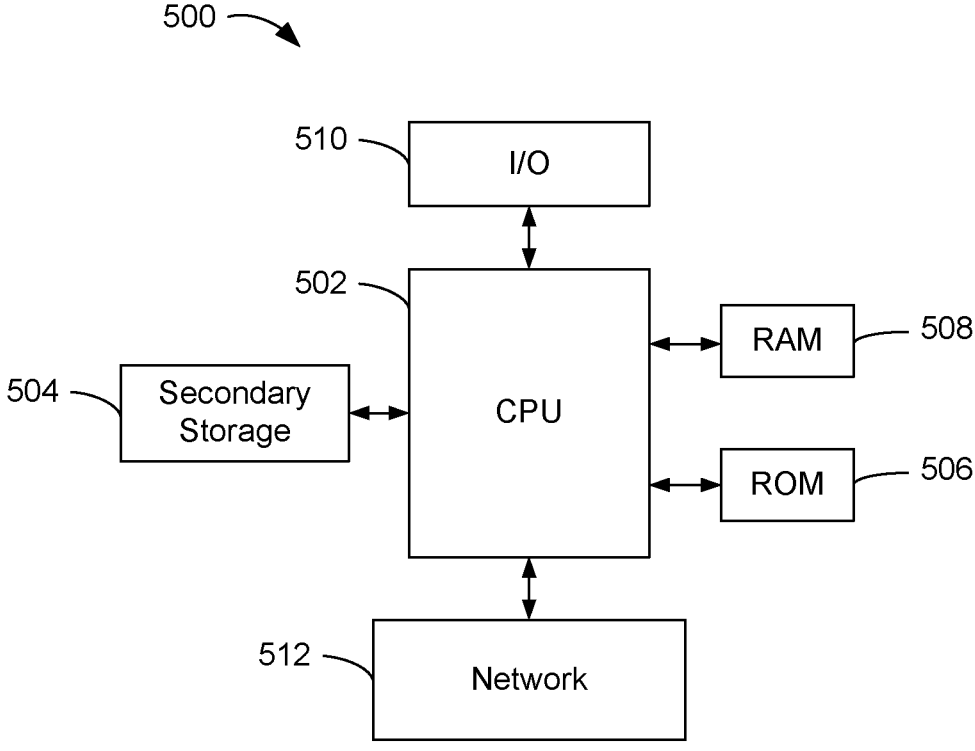
FIG. 5 is a block diagram or a hardware architecture of a device according to an embodiment of the disclosure.

FIG. 5 is a block diagram or a hardware architecture of a device 500 according to an embodiment of the disclosure. The device 500 may be suitable for implementing any of the power harvesting circuit 208, the selector 210, or the sequencer 350. The device 500 includes a processor 502 (which may be referred to as a central processor unit or CPU) that is in communication with memory devices including secondary storage 504, ROM 506, and RAM 508. The processor 502 is also in communication with input/output (I/O) devices 510 (for example, the selector 210, the modulation circuits 304a-304n, or the power harvesting circuits 308a-308n), and network connectivity devices 512 (for example, the modulation circuit 204 or the demodulation circuit 206). The processor 502 may be implemented as one or more CPU chips.

It is understood that by programming and/or loading executable instructions onto the device 500, at least one of the CPU 502, the RAM 508, and the ROM 506 are changed, transforming the device 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted (for example, by receiving electrical power from the power harvesting circuit 208 or one of the power harvesting circuits 308a-308n), the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 may be faster than to secondary storage 504. The secondary storage 504, the RAM 508, and/or the ROM 506 may be referred to in some contexts as computer readable storage media and/or non-transitory computer readable media.

The processor 502 executes instructions, codes, computer programs, scripts which it accesses from the secondary storage 504, the ROM 506, or the RAM 508. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, the ROM 506, and/or the RAM 508 may be referred to in some contexts as non-transitory instructions and/or non-transitory information.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the device 500 is powered up and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A multiple identity (ID) tag device comprising:
an antenna;
a power harvesting circuit electrically coupled to the antenna and configured to receive RF energy collected by the antenna and convert the RF energy into electrical power;
a demodulation circuit electrically coupled to the antenna;
a modulation circuit electrically coupled to the antenna;
a selector circuit electrically coupled to the power harvesting circuit, the demodulation circuit, and the modulation circuit and configured to receive a first signal from the demodulation circuit, send a second signal to the modulation circuit, and receive electrical power from the power harvesting circuit; and
a plurality of ID storage circuits electrically coupled to the selector circuit, each ID storage circuit configured to receive the first signal from the selector circuit, send the second signal to the selector circuit, and receive the electrical power from the selector circuit.

2. The multiple ID tag device of claim 1, wherein the power harvesting circuit is configured to:
receive a third signal from one of the demodulation circuit and the selector circuit, where the third signal indicates receipt of the first signal; and
determine whether an ID storage circuit of the plurality of ID storage circuits responds to the first signal with the second signal based on a fourth signal received from one of the modulator circuit and the selector circuit.

3. The multiple ID tag device of claim 2, wherein the power harvesting circuit is configured to determine whether the ID storage circuit responded to the first signal with the second signal by individually and sequentially activating at least some ID storage circuits of the plurality of ID storage circuits and determining whether each activated ID storage circuit responds to the first signal with the second signal.

4. The multiple ID tag device of claim 1, wherein the power harvesting circuit comprises a power storage component.

5. The multiple ID tag device of claim 1, wherein the power harvesting circuit is configured to:
receive from the antenna via the demodulation circuit a disable signal comprising information specifying an ID storage circuit of the plurality of ID storage circuits; and
in response to receiving the disable signal, disable the specified ID storage circuit.

6. The multiple ID tag device of claim 5, wherein the disable signal comprises a received password and the power harvesting circuit is configured to disable the specified ID storage circuit only in response to determining that the received password matches a stored password that is stored in the multiple ID tag device.

7. The multiple ID tag device of claim 1, wherein the power harvesting circuit is configured to:
receive from the antenna via the demodulation circuit an enable signal comprising information specifying an ID storage circuit of the plurality of ID storage circuits; and
in response to receiving the enable signal, enable the specified ID storage circuit.

8. The multiple ID tag device of claim 1, wherein the power harvesting circuit, the demodulation circuit, the modulation circuit, the selector circuit, and the plurality of ID storage circuits are provided on a single semiconductor substrate.

9. The multiple ID tag device of claim 8, wherein the antenna is provided on the single semiconductor substrate.

10. The multiple ID tag device of claim 1, wherein (i) each ID storage circuit of the plurality of ID storage circuits provides data for separate stages of a lifecycle of a product to which the multiple ID tag device is attached, (ii) the plurality of ID storage circuits are used to provide multiple programming bits of data that encode information about an object to which the multiple ID tag device is attached, or (iii) at least some of the plurality of ID storage circuits are used to provide information about contents of a container to which the multiple ID tag is attached.

11. A multiple identity (ID) tag device comprising:
an antenna; and
a plurality of ID storage modules electrically coupled to the antenna, each ID storage module comprising:
a power harvesting circuit electrically coupled to the antenna and configured to receive RF energy collected by the antenna from an ambient electromagnetic field;
a demodulation circuit electrically coupled to the antenna;
a modulation circuit electrically coupled to the antenna;
an ID storage circuit electrically coupled to the power harvesting circuit, the demodulation circuit, and the modulation circuit, the ID storage circuit configured to receive a first signal from the demodulation circuit, send a second signal to the modulation circuit, and receive electrical power from the power harvesting circuit; and
a sequencer circuit coupled to the power harvesting circuit of each ID storage module of the plurality of ID storage modules, the sequencer circuit configured to activate each power harvesting circuit of the plurality of ID storage modules individually and, in response, receive and transmit to the antenna information about a product to which the multiple ID tag device is attached.

12. The multiple ID tag device of claim 11, wherein the power harvesting circuit of at least one ID storage module of the plurality of ID storage modules is configured to:
receive from the antenna via the demodulation circuit a disable signal comprising information identifying the ID storage circuit; and
in response to receiving the disable signal, disable the ID storage circuit.

13. The multiple ID tag device of claim 12, wherein the disable signal comprises a received password and the power harvesting circuit is configured to disable the ID storage circuit only in response to determining that the received password matches a stored password that is stored in the multiple ID tag device.

14. The multiple ID tag device of claim 11, wherein the power harvesting circuit of at least one ID storage module of the plurality of ID storage modules is configured to:

receive from the antenna via the demodulation circuit an enable signal comprising information identifying the ID storage circuit; and in response to receiving the enable signal, enable the ID storage circuit.

15. The multiple ID tag device of claim 11, wherein the antenna and the plurality of ID storage modules are provided in common on a single semiconductor substrate.

16. The multiple ID tag device of claim 11, wherein (i) each ID storage circuit provides data for separate stages of a lifecycle of a product to which the multiple ID tag device is attached, (ii) the ID storage circuit in each the plurality of ID storage modules is used together to provide multiple programming bits of data that encode information about an object to which the multiple ID tag device is attached, or (iii) the ID storage circuit in two or more of the plurality of ID storage modules is used to provide information about contents of a container to which the multiple ID tag is attached.

17. The multiple ID tag device of claim 11, wherein the sequencer circuit is configured to continue activating different ones of the plurality of ID storage modules individually until all of the plurality of ID storage modules have been activated without a response being sent.

18. The multiple ID tag device of claim 11, wherein the sequencer circuit is configured to cease activating the plurality of ID storage modules once one of the ID storage modules has sent a response.

19. The multiple ID tag device of claim 11, wherein the sequencer circuit is configured to continue activating other ones of the plurality of ID storage modules after one of the ID storage modules has sent a response.

20. A multiple identity (ID) tag device comprising:

an antenna; and a plurality of ID storage modules electrically coupled to the antenna, each ID storage module comprising:

a power harvesting circuit electrically coupled to the antenna and configured to receive RF energy collected by the antenna from an ambient electromagnetic field;

a demodulation circuit electrically coupled to the antenna;

a modulation circuit electrically coupled to the antenna; and an ID storage circuit electrically coupled to the power harvesting circuit, the demodulation circuit, and the modulation circuit, the ID storage circuit configured to receive a first signal from the demodulation circuit, send a second signal to the modulation circuit, and receive electrical power from the power harvesting circuit, wherein the power harvesting circuit of each ID storage module of the plurality of ID storage modules is configured to wait for a predetermined amount of time after receiving RF energy from the antenna before supplying power to the demodulation circuit, the modulation circuit, and the ID storage circuit of the ID storage module.

\* \* \* \* \*